No. 701,704. Patented June 3, 1902.
D. O. FREEMAN.
GAS PURIFIER.
(Application filed Oct. 12, 1901.)
(No Model.)
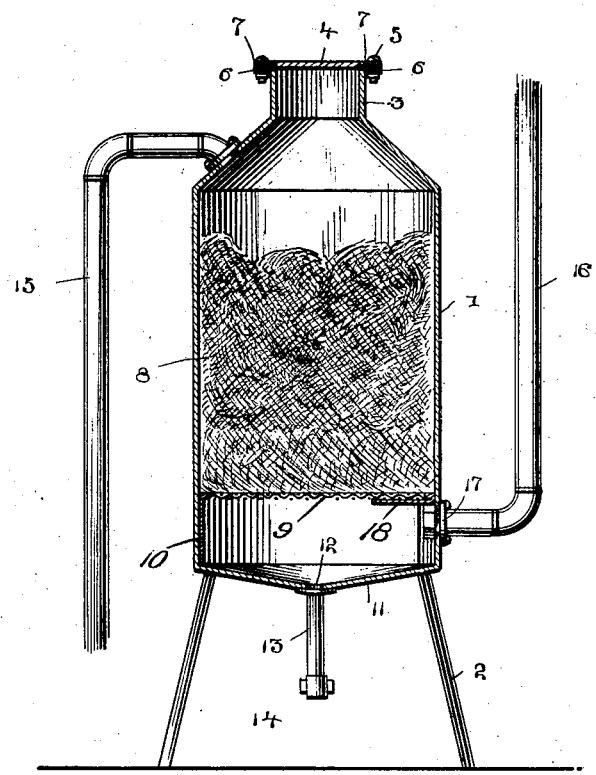
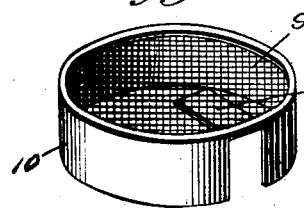

UNITED STATES PATENT OFFICE.

DELBERT O. FREEMAN, OF BINGHAMTON, NEW YORK, ASSIGNOR OF ONE-HALF TO THE REX ACETYLENE GENERATOR COMPANY, OF BINGHAMTON, NEW YORK, A CORPORATION OF NEW YORK.

GAS-PURIFIER.

SPECIFICATION forming part of Letters Patent No. 701,704, dated June 3, 1902.

Application filed October 12, 1901. Serial No. 78,472. (No model.)

*To all whom it may concern:*

Be it known that I, DELBERT O. FREEMAN, a citizen of the United States, residing at and whose post-office address is Binghamton, in the county of Broome and State of New York, have invented new and useful Improvements in Gas-Purifiers, of which the following is a specification.

My invention relates to apparatus for purifying acetylene gas, the object being to provide a simple and inexpensive purifier adapted to be connected with a generator by pipe connections and to deliver the purified gas to the house service-pipe.

Any suitable purifying material can be employed in the apparatus; but I prefer to use a compound known to the trade as "puratylene."

The apparatus comprises a cylindrical receptacle closed at top and bottom, a screen or grating therein upon which the purifying material is supported, an inlet-pipe at the top of the cylinder, an outlet-pipe adjacent to the bottom of the cylinder, a depressed bottom for the cylinder, and a drip-pipe depending centrally from said bottom.

In the accompanying drawings, Figure 1 is a view of the apparatus, the cylinder being shown in vertical section and the pipes in side elevation; and Fig. 2 is a perspective view of the screen and its support removed from the cylinder.

The reference-numeral 1 designates a cylindrical receptacle supported upon legs 2 and having its upper end contracted and formed with a neck 3, normally closed by a cover 4, which is secured by bolts 5. The upper end of the neck 3 is provided with an annular horizontal flange 6, upon which the cover rests, and a washer 7 is interposed between the flange and cover to insure a gas-tight joint. The neck 3 of the receptacle constitutes a hand-hole when the cover is removed, through which the purifying material 8 is introduced.

9 designates a screen or grating upon which the purifying material rests.

The bottom 11 is centrally depressed and formed with an opening 12, communicating with a depending drip-pipe 13, closed at its lower end by a removable cap 14.

15 designates the gas-inlet pipe leading from the generator and connecting with the receptacle at the top thereof.

16 designates the house service-pipe leading from the discharge-opening 17, formed in the side of the receptacle below the screen and above the bottom of the receptacle.

The gas entering through the pipe 15 passes down through the purifying material and thence into the service-pipe 16 to the burners. The condensed moisture accumulates in the space below the grating 9 and is discharged into the drip-pipe 13, from whence it is removed.

The screen 9 is supported above the bottom of the cylinder by means of a ring 10, of galvanized iron, secured to the under side of the screen and resting upon the bottom 11. This ring is slitted longitudinally at opposite sides of the outlet 17, and the metal flap 18 thus formed is bent up to the position shown in the drawings to serve as a guard to prevent the outlet-opening from being filled with the purifying material and drippings.

It will be noted that the apparatus is simple and durable in construction and effectively accomplishes the purification of the gas as it is supplied to the burners.

I claim—

1. A gas-purifying apparatus comprising a cylinder, inlet and outlet pipes communicating with the cylinder, a screen within the cylinder, means for supporting said screen above the bottom of the cylinder consisting of a ring depending therefrom and longitudinally slitted to form a flap, said flap bent inward and upward beneath the screen to provide a guard for the outlet.

2. A gas-purifying apparatus comprising a cylinder, inlet and outlet pipes communicating with the cylinder, a screen within the cylinder, and means for supporting said screen above the bottom of the cylinder consisting of a ring depending therefrom and longitudinally slitted to provide a guard for the outlet.

In testimony whereof I affix my signature in presence of two witnesses.

DELBERT O. FREEMAN.

Witnesses:
MINNIE G. REILLY,
B. IRA LEWIS.